3,393,224
LOWER ALIPHATIC ESTERS OF N-PHENYL AND N-m-CHLOROPHENYL CARBAMIC ACID CONTAINING AN ACYL GROUP
Robert Frederick Brookes, David Henry Godson, and Edward Levi Leafe, Nottingham, England, assignors to Boots Pure Drug Company Limited, Nottingham, England, a British company
No Drawing. Filed June 15, 1964, Ser. No. 375,314
Claims priority, application Great Britain, June 25, 1963, 25,271/63
4 Claims. (Cl. 260—471)

ABSTRACT OF THE DISCLOSURE

Compounds of the formula

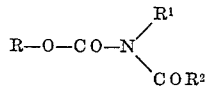

wherein R is a saturated or unsaturated hydrocarbon radical of 3–6 carbon atoms which can be halogen substituted or lower alkoxy substituted, $R^1$ is phenyl or m-chloro phenyl and $R^2CO$ is an acyl residue of an organic acid such as aliphatic saturated and unsaturated carboxylic acids, benzoic acids and dialkyl carbamic acids which have selective herbicidal properties.

---

This invention relates to new chemical compounds and to herbicidal compositions containing them. It further relates to methods of controlling weeds using the compounds.

Selective weed control by chemical means is now an established practice in agriculture and horticulture and many selective weedkillers are now available. However the search continues for weedkillers with weed control spectra and selectivity characteristics different from those possessed by the available products, due to the fact that selective control of many weeds in many crops is still not attainable in a satisfactory manner.

It is known that certain substituted and unsubstituted alkyl, alkenyl and alkynyl esters of N-phenyl- and N-m-chlorophenyl carbamic acid are effective weedkillers which exhibit selectivity towards certain weeds and crops. Examples include isopropyl N-phenylcarbamate and isopropyl N-m-chlorophenylcarbamate.

We have now found that N-phenyl- and N-m-chlorophenylcarbamates of this type, in which the hydrogen atom attached to the nitrogen atom is replaced by a carboxylic acid acyl group, possess selective weedkilling properties.

According to one feature of the invention there are provided novel compounds of the general Formula I

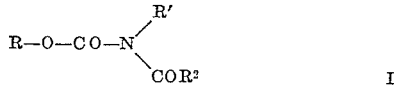

wherein R represents a saturated or unsaturated aliphatic radical containing 3–6 carbon atoms, if desired substituted with one or more halogen atoms or lower alkoxy radicals; R' represents a phenyl or m-chlorophenyl radical, and $R^2CO$ represents the residue of an organic carboxylic acid.

Representative of the compounds of the invention are those containing the radicals listed below; this list is illustrative only and is not intended to limit the invention.

R

Propyl, propenyl, propynyl, butyl, butenyl, butynyl, pentyl, pentenyl, pentynyl, hexyl, hexenyl and hexynyl.

(For the sake of brevity, the isomeric variations are not listed in full; however it will be appreciated that "propyl" includes n-propyl and isopropyl, and so forth.) The aforementioned radicals may contain halogen, particularly chlorine, or lower alkoxy substituents. A particularly important and preferred radical is isopropyl; other important radicals include 2-methoxy-1-methylethyl, 4-chlorobut-2-yn-1-yl, but-1-yn-3-yl, secbutyl, 2-chloro-1-chloromethylethyl, n-propyl and allyl.

$R^2CO$ (a) The residue of an aliphatic or substituted aliphatic carboxylic acid. Such acids include the saturated acids, e.g., acetic, propionic, butyric; the aliphatic acids containing unsaturated linkages, e.g., acrylic, methacrylic, crotonic; aliphatic acids containing one or more substituents such as halogen atoms or alkoxy, aryloxy, alkylthio, alkylsulphinyl, alkylsulphonyl, arylthio, arylsulphinyl, arylsulphony, aryl, amino, substituted amino, hydroxy, cyano, acyloxy carboxyl (as COOH or in the form of salts or esters), acyl, sulphamoyl substituted sulphamoyl, carbamoyl and substituted carbamoyl radicals, e.g., trichloracetic, methoxyacetic, phenylacetic, phenylpropionics, chlorophenylacetics, phenoxyacetic, phenoxyphenylacetic, diphenylpropionic, phenoxypropionics, 2,4-dichlorophenoxyacetic, 4 - chloro - 2-methylphenoxyacetic, alpha - (4-chloro-2-methylphenoxy)-propionic, diphenylacetic, naphthoxyacetic; and the cycloaliphatic acids, e.g., cyclohexane carboxylic, cyclopentane carboxylic.

(b) The residue of a mono-, di- or poly-nuclear aromatic acid. Such acids include benzoic acid and the naphthoic acids, and derivatives of these acids containing in the nuclei substituents such as one or more halogen atoms or alkyl, alkoxy, alkylthio, alkyl-sulphinyl, alkylsulphonyl, alkenyl, nitro, amino, substituted amino, phenyl, phenoxy, phenylthio, phenyl-sulphinyl, phenylsulphonyl, cyano, hydroxy, acyloxy, acyl, carboxyl (as COOH or in the form of salts or esters) cycloalkyl, phenylazo, sulphamoyl substituted sulphamoyl, carbamoyl or substituted carbamoyl radicals. Compounds of the invention in which $R^2CO$ is benzoyl or substituted benzoyl represent a preferred group of compounds.

(c) The residue of a substituted carbamic acid, i.e., $HOCONR^3R^4$, in which $R^3$ represents a hydrogen atom or an alkyl, cycloalkyl, aralkyl or aryl radical and $R^4$ represents an alkyl, cycloalkyl, aralkyl or aryl radical, or $R^3$ and $R^4$ are joined to form with the nitrogen atom to which they are attached a heterocyclic ring, e.g., methylcarbamic, dimethylcarbamic, phenylcarbamic, pentamethylenecarbamic.

(d) The residue of a heterocyclic carboxylic acid, such as for example the pyridine carboxylic acids, furoic acid, the quinoline carboxylic acids, the quinoxaline carboxylic acids, thiophene carboxylic acid.

The compounds of the invention have been found to possess valuable selective weedkilling properties. More particularly we have found that by replacement of the hydrogen atom attached to the nitrogen atom of a herbicidal ester of N-phenyl- or N-m-chlorophenylcarbamic acid with an acyl radical, it is possible to produce compounds possessing weedkilling activities and crop selectivity characteristics different from those exhibited by the parent carbamates. A particularly interesting feature which we have discovered is that variation of the acyl radical attached to the nitrogen atom of a particular ester of N-phenyl- or N-m-chlorophenylcarbamic acid leads to compounds possessing varying weedkilling activities and crop selectivity characteristics. Because of this, it will be appreciated that all the compounds of general Formula I are not equivalent in respect of the weed spectra which they will control and their selectivity towards crops.

Compounds of the invention in which R represents an isopropyl radical exhibit particularly effective weedkilling activities and these compounds are a preferred group.

The group of compounds in which $R^2CO$ represents a benzoyl or substituted benzoyl radical includes within it many compounds possessing weedkilling activities and crop selectivity characteristics appreciably different from and superior to those possessed by the parent carbamates, and for this reason is a preferred group. The nature and position of the substituents in the benzoyl radical markedly influence the properties of the compounds and a preferred group of compounds is that in which the benzoyl radical contains at least one unsubstituted ortho-position.

The effect of introducing an N-acyl radical into a herbicidal ester of N-phenyl- or N-m-chlorophenylcarbamic acid is to modify the crop selectivity and weedkilling activity of the ester. The magnitude and nature of the modification varies from one acyl radical to another, and the effect of a particular acyl radical on a particular ester may not be the same as the effect of the same acyl radical on a different ester. The introduction of N-acyl radicals into herbicidal esters of N-phenyl- and N-m-chlorophenyl carbamic acids therefore makes possible the provision of selective weedkillers with improved safety towards crops, if by suitable choice of acyl radical the weed control activity of the parent carbamate is substantially maintained but the phytotoxicity towards crops is reduced.

The compounds of the invention may be prepared in a number of ways, for example, as follows:

(a) By acylation of a compound of general Formula II

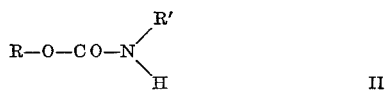
II wherein R and R' are as hereinbefore defined, or a metal salt thereof, with an acylating agent capable of providing the $R^2CO$—radical. Such agents include the anhydrides (i.e., $(R^2CO)_2O$), the acid chlorides, and the corresponding esters and ketenes. When an acid chloride is used, the compound of general Formula II is preferably used as a metal salt, e.g., the sodio derivative. When an anhydride is used, the presence of an acylation catalyst is desirable, e.g., sulphuric acid.

(b) By reaction of a compound of general Formula III

III preferably in the form of a metal salt, e.g., the sodio derivative, wherein R' and $R^2CO$ are as hereinbefore defined, with a haloformic ester of the general Formula IV

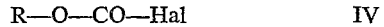
R—O—CO—Hal    IV wherein R is as hereinbefore defined and Hal represents a halogen, preferably a chlorine, atom.

(c) By reaction of the appropriate hydroxy compound ROH with a carbamoyl halide of the general Formula V

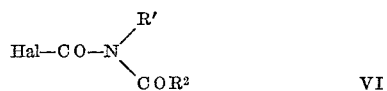
VI wherein R, R', $R^2CO$ and Hal are as hereinbefore defined.

(d) By reaction of a carbonic acid derivative of general Formula VI

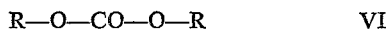
R—O—CO—O—R    VI wherein R is as hereinbefore defined, with a compound of the aforementioned general Formula III preferably in the form of a metal salt thereof.

(e) By ester interchange, whereby the appropriate compound ROH is reacted with an ester of Formula VII

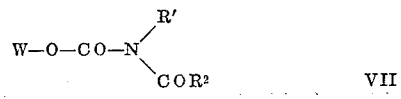
VII wherein R, R' and $R^2CO$ are as hereinbefore defined and W is an ester-forming radical which is different from R in the compound ROH.

(f) By acylation of a compound of general Formula II

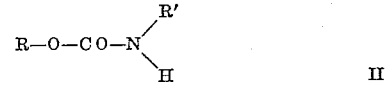
II wherein R and R' are as hereinbefore defined, or a metal salt thereof, with an acylating agent derived from a dibasic acid, HOOC—X—COOH to provide compounds of the invention conforming to the Formula VIII

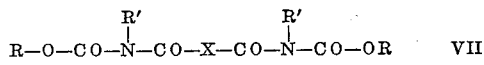
VII wherein X is a valency bond, and alkylene radical or an arylene radical. In this case the radical —$COR^2$ as defined in general Formula I is

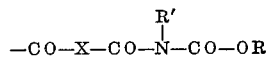

According to a further feature of the invention there are provided herbical compositions which comprise a compound of the aforementioned general Formula I in association with a conventional herbicide adjuvant. The term "conventional herbicide adjuvant" used in this specification is to be interpreted as meaning any diluent or carrier which may be used for the formulation of herbicidal compounds. Typical adjuvants include dispersing agents, emulsifying agents, wetting agents and pulverulent solid diluents. The compositions of the invention include not only compositions in a suitable form for application but also concentrated compositions which may be supplied for the user and which require dilution with a suitable quantity of water or other diluent before application.

Typical compositions falling within the invention include the following:

(a) Dispersible solutions.—A dispersible solution comprises a solid, active ingredient of low water solubility dissolved in a water-miscible solvent, with the addition of a dispersing agent, such that an aqueous dispersion is formed on dilution with water.

(b) Dispersible powders.—A dispersible powder comprises a solid active ingredient of low water solubility in association with a dispersing agent, and a solid inert diluent if desired, for example kaolin.

(c) Miscible oils.—A miscible oil comprises an active ingredient of low water solubility dissolved in a water-immiscible solvent with the addition of an emulsifying agent such that an emulsion is formed on dilution with water. Alternatively the user may be supplied with a concentrated emulsion obtained from a miscible oil by the addition of approximately an equal volume of water. Such concentrated emulsions are diluted with an appropriate amount of water before application.

(d) Concentrated suspension.—A concentrated suspension comprises a solid, active ingredient of low water solubility milled to a paste with water and a dispersing agent.

(e) Dusts.—A dust comprises an active ingredient in association with a solid, pulverulent diluent which may be an inert diluent such as kaolin or a standard agricultural fertiliser.

(f) Granular solids.—These comprise an active ingredient associated with similar solid diluents to those which may be employed in the dust compositions, but the mixture is granulated by methods well-known in the art.

The dispersible solutions, dispersable powders, miscible oils and concentrated suspensions may also contain a wetting agent if desired.

The compositions may contain, in addition to the ingredients already mentioned, other conventional additives known in the art of herbicide formulations. Thus for example, compositions intended for application as sprays may contain an antifoam agent, e.g., liquid paraffin or a silicone fluid. The compositions may also contain additional herbicidal active ingredients.

According to a further feature of the invention there is provided a method for eradicating weeds which comprises applying to the weeds or to the soil containing them a phytotoxic amount of a compound of general Formula I. In one embodiment of this feature there is provided a method for eradicating weeds from a crop area containing a growing crop which comprises applying to the crop area a compound of general Formula I at a dosage rate exerting a phytotoxic action against the weeds but substantially non-phytotoxic to the crop. The compounds are preferably applied prior to the emergence of the weeds. Application may be on the surface of the soil only, for example by spraying, or by incorporation in the top few inches of soil, for example by spraying followed by discing or harrowing. In most cases application will be carried out prior to emergence of both weeds and crop, but occasions will arise when treatment is carried out prior to emergence of the weeds but after the emergence of the crop. Some of the compounds may also find use in controlling weeds by application after emergence thereof. The concentration of active ingredient in the compositions of the invention which are applied for weed control is dependent on the particular composition and the type of machine which is to be used. For example in the case of liquid compositions which are applied as sprays, low and high volume sprayers are commonly used to deliver liquid at rates from about 5 to 100 gallons per acre, and these require compositions containing different concentrations of active ingredient. From the point of view of weed control the important consideration is the total quantity of active ingredient applied per unit area of the soil. This dosage will vary from one compound of the invention to another and also according to the crop and the weeds to be controlled. However in general, rates of ¼–50 lb./acre will normally be found to be effective, with rates of ½–5 lb./acre being satisfactory in the majority of cases.

Both broad-leaved weeds and graminaceous weeds may be controlled by application of compounds falling within general Formula I by appropriate selection of radicals represented by R, R' and R²CO. Typical weeds include annual meadow grass (*Poa annua*), red shank (*Polygonum persicaria*), chickweed (*Stellaria media*) and fat hen (*Chenopodium album*). Selective weed control in crops such as sugar beet, peas and plantation crops may be carried out. Of particular value is the selective control of fat hen in sugar beet with greater safety towards the crop than is possible using the known weedkillers isopropyl N-phenylcarbamate and isopropyl N-m-chlorophenylcarbamate.

The selective effects of introducing different N-acyl radicals into a herbicidal ester of N-phenyl- or N-m-chlorophenylcarbamic acid are illustrated by the results shown in the following table obtained with isopropyl N-m-chlorophenylcarbamate and three N-acyl derivatives thereof by seeding the crops and weeds in trays in the greenhouse and spraying the soil immediately with a range of logarithmically related application rates of the chemicals under test, from ¼ lb. per acre to 16 lb. per acre. The effect of the treatments were recorded using a scoring system as follows:

0=No control at all application rates; 1=control down to 8 lb. per acre; 2=control down to 4 lb. per acre; 3=control down to 2 lb. per acre; 4=control down to 1 lb. per acre; 5=control down to ½ lb. per acre; 6=control down to ¼ lb. per acre.

| Compound | Pea | Kale | Broad Bean | Flax | Wheat | Barley | Sugar Beet | May-weed | Fat hen | Chick-weed | Rye Grass | Red Shank |
|---|---|---|---|---|---|---|---|---|---|---|---|---|
| Isopropyl N-m-chlorophenylcarbamate | 3 | 4 | 0 | 6 | 6 | 6 | 6 | 2 | 6 | 6 | 6 | 6 |
| Isopropyl N-benzoyl-N-m-chlorophenylcarbamate | 0 | 2 | 3 | 3 | 5 | 6 | 3 | 1 | 3 | 6 | 6 | 6 |
| Isopropyl N-p-chlorobenzoyl-N-m-chlorophenyl carbamate | 1 | 3 | 4 | 5 | 5 | 6 | 3 | 2 | 4 | 5 | 5 | 6 |
| Isopropyl N-2,5-di-chlorobenzoyl-N-m-chlorophenyl-carbamate | 0 | 0 | 0 | 0 | 4 | 6 | 1 | 0 | 0 | 3 | 2 | 4 |

The following nonlimitative examples illustrate the invention.

EXAMPLE 1

Isopropyl N-phenylcarbamate (10 gm.) and acetic anhydride (50 ml.) containing concentrated sulphuric acid (2 drops) were heated under reflux for 30 minutes. Anhydrous sodium acetate (1 gm.) was added and excess acetic anhydride distilled off in vacuo. Addition of water caused a crystalline solid to separate, which was recrystallised twice from light petroleum (B.P. 40–60° C.) to give isopropyl N-acetyl-n-phenylcarbamate, M.P. 85–86° C.

In a similar manner there were prepared isopropyl N-acetyl-N-m-chlorophenylcarbamate, M.P. 48–50° C. and 4-chlorobut-2-ynyl N-acetyl-N-m-chlorophenylcarbamate, M.P. 63.5–65° C.

EXAMPLE 2

Isopropyl N-m-chlorophenylcarbamate (10.7 gm.) in toluene (150 ml.) was dried and heated at 100° C. for 6 hours with sodium hydride suspension (2.5 gm. of 50% w./w. in mineral oil). After cooling, m-nitrobenzoyl chloride (8 gm.) was added and the mixture heated at 60° C. for 1 hour. After cooling and filtering, evaporation of the solvent gave a gum which was crystallised from light petroleum (B.P. 62–68° C.). Further recrystallisation from a mixture of toluene and light petroleum gave isopropyl N - m - chlorophenyl-N-m-nitrobenzoylcarbamate, M.P. 89–90° C.

In a similar manner there were prepared the following compounds.

| R | R' | COR² | M.P. or B.P. (° C.) |
|---|---|---|---|
| Isopropyl | m-Chlorophenyl | Dimethylcarbamoyl | 130–132/0.2 mm. |
| Do | Phenyl | do | 92–94. |
| Do | m-Chlorophenyl | p-Nitrobenzoyl | 100–101. |
| Do | do | m-Toluoyl | 54.5–56. |
| Do | do | Methoxyacetyl | 153–154/1 mm. |
| Do | do | Trichloroacetyl | 51.5–52.5. |
| Do | do | N,N-pentamethylene carbamoyl | 58–59.5. |
| Do | do | N-benzyl-N-methylcarbamoyl | 182–184/0.05 mm. |
| Do | do | Diphenylcarbamoyl | 101–102. |
| Do | do | N-cyclohexyl-N-methylcarbamoyl | 168–170/0.15 mm. |

EXAMPLE 3

Phenoxyacet-m-chloroanilide (13.1 gm.) was stirred in dry toluene (100 ml.) and sodium hydride (2.64 gm. of 50% w./w. oil dispersion) added. Slow heating to reflux resulted in a vigorous reaction and heating was continued until evolution of hydrogen ceased. Isopropyl chloroformate (6.78 gm.) in dry toluene (10 ml.) was then added, and when reaction had ceased the mixture was filtered and solvent removed by distillation in vacuo. The residual oil was diluted with light petroleum (B.P. 40–60° C.) and kept overnight at 0° C. to yield a solid, which was recrystallized from light petroleum (B.P. 60–80° C.) to give isopropyl N-m-chlorophenyl-N-phenoxyacetylcarbamate, M.P. 80–82° C.

Compounds listed in the following table were prepared in a similar manner, by reaction of the sodio derivative of the appropriate anilide with the appropriate ester of chloroformic acid.

EXAMPLE 5

A dispersible powder was prepared by grinding a mixture of isopropyl N-p-toluoyl-N-phenylcarbamate (20 parts), Belloid T.D. (a proprietary dispersing agent which is a condensate of formaldehyde and an alkyl arylsulphonate—8 parts) and kaolin (72 parts). (All parts by weight.)

EXAMPLE 6

A dust was prepared by grinding isopropyl N-p-toluoyl-N-phenyl-carbamate (10 parts by weight) with kaolin (90 parts by weight).

EXAMPLE 7

The sodio derivative of acetanilide (prepared from 6.75 gm. acetanilide) was added to a saturated solution

| R | R' | $COR^2$ | M.P. or B.P. (° C.) |
|---|---|---|---|
| n-Propyl | Phenyl | Benzoyl | 50–51.5 |
| Isopropyl | do | Acetyl | 85–86 |
| Do | do | Propionyl | 38–40 |
| Do | do | Isobutyryl | 118–119°/1.5 mm. |
| Do | do | 2-methylpentanoyl | 134–135°/1.5 mm. |
| Do | do | N-octanoyl | 166–168°/1.8 mm. |
| Do | do | p-Chlorophenyl acetyl | 82–83.5 |
| Do | do | Alpha-(4-chloro-2-methylphenoxy) propionyl | 93–94 |
| Do | do | 4-chloro-2-methyl phenoxyacetyl | 122–123 |
| Do | do | 2-naphthoxyacetyl | 109–111 |
| Do | do | Diphenylacetyl | 100–101 |
| Do | do | Cyclohexanecarbonyl | 60–61.5 |
| Do | do | Benzoyl | 68.69.5 |
| Do | do | o-Chlorobenzoyl | 37.5–39 |
| Do | do | m-Chlorobenzoyl | 85.5–86 |
| Do | do | p-Chlorobenzoyl | 63–46 |
| Do | do | o-Bromobenzoyl | 197–199°/1.5 mm. |
| Do | do | o-Fluorobenzoyl | 63.0–63.5 |
| Do | do | m-Fluorobenzoyl | 63.0–63.5 |
| Do | do | o-Iodobenzoyl | 85–86 |
| Do | do | o-Toluoyl | 48–49 |
| Do | do | m-Toluoyl | 85.5–86.5 |
| Do | do | p-Toluoyl | 91–91.5 |
| Do | do | o-Nitrobenzoyl | 96.5–98 |
| Do | do | m-Nitrobenzoyl | 72.5–74 |
| Do | do | p-Nitrobenzoyl | 112.5–113.5 |
| Do | do | o-Methoxybenzoyl | 64–65 |
| Do | do | p-Methoxybenzoyl | 75–76 |
| Do | do | 2,4-dichlorobenzoyl | 64–65 |
| Do | do | 2,6-dichlorobenzoyl | 73–74.5 |
| Do | do | 2,5-dichlorobenzoyl | 122–124 |
| Do | do | 2,6-dimethoxybenzoyl | 95–96 |
| Do | do | Alpha-naphthoyl | 93–94 |
| Do | do | Beta-naphthoyl | 134.5–135.5 |
| Prop-2-ynyl | do | Acetyl | 69–70 |
| Allyl | do | o-Chlorobenzoyl | 64.5–65 |
| 2-methoxy-1-methylethyl | do | do | 210–212°/2.5 mm. |
| Do | do | p-Chlorobenzoyl | 207–210°/2 mm. |
| Isopropyl | m-Chlorophenyl | Acetyl | 48–50 |
| Do | do | Cyclohexane carbonyl | 177–178°/1.7 mm. |
| Do | do | Benzoyl | 56–57 |
| Do | do | o-Chlorobenzoyl | 65.5–66.5 |
| Do | do | m-Chlorobenzoyl | 80.5–81 |
| Do | do | p-Chlorobenzoyl | 65–66 |
| Do | do | o-Bromobenzoyl | 93–94 |
| Do | do | o-Iodobenzoyl | 88.5–89.5 |
| Do | do | o-Fluorobenzoyl | 73.5–75 |
| Do | do | m-Fluorobenzoyl | 89.5–91 |
| Do | do | o-Toluoyl | 70–71 |
| Do | m-Chlorophenyl | p-Toluoyl | 61–62 |
| Do | do | 3,4-dichlorobenzoyl | 93.5–95 |
| Do | do | 2,5-dichlorobenzoyl | 93–94.5 |
| Allyl | do | o-Chlorobenzoyl | 59–60 |
| 2-methoxy-1-methylethyl | do | Benzoyl | 180–186°/1.0 mm. |
| 1-methylpentyl | do | do | 206–210°/2 mm. |
| 1-methylbutyl | do | do | 204–208°/2.5 mm. |
| Isopropyl | Phenyl | m-Methoxybenzoyl | 62–63 |
| Do | do | p-t-Butylbenzoyl | 95–96 |
| Do | m-Chlorophenyl | do | 90–91 |
| Do | do | p-Methoxybenzoyl | 221–225°/1.5 mm. |
| Do | Phenyl | 1-Naphthyl-acetyl | 87.5–89 |
| 1-chloromethylethyl | do | o-Chlorobenzoyl | 212–214°/1.5 mm. |
| Do | do | do | 210–214°/2 mm. |
| Isopropyl | do | Cinnamoyl | 103.5–104.5 |

EXAMPLE 4

A miscible oil was prepared by mixing the following ingredients:

| | |
|---|---|
| Isopropyl N - 2 - chlorobenzoyl - N - phenyl-carbamate | 50 gm. |
| Agrilan A (a proprietary emulsifying agent which is a fatty acid monoglyceride) | 5 gm. |
| Xylene | To 100 ml. | of phosgene in toluene (200 ml.) at 10° C., and the mixture heated to 40° C. After cooling and filtering, the filtrate was evaporated and to the residue there was added a solution of isopropanol (5 ml.) and pyridine (4.2 ml.) in toluene (50 ml.) at room temperature. The reaction mixture was washed with water, evaporated and the residual oil crystallised from light petroleum to give isopropyl N-acetyl-N-phenylcarbamate, M.P. 85–86° C. as described in Example 3.

We claim:
1. A compound of the formula

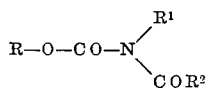

wherein R represents a radical selected from the group consisting of saturated and unsaturated aliphatic hydrocarbon radicals containing 3–6 carbon atoms, chlorine substituted saturated and unsaturated aliphatic hydrocarbon radicals containing 3–6 carbon atoms and lower alkoxy substituted saturated and unsaturated aliphatic hydrocarbon radicals in which said aliphatic hydrocarbon radicals contain 3–6 carbon atoms, $R^1$ represents a radical selected from the group consisting of phenyl and m-chlorophenyl and $R^2CO$ represents the acyl residue of a di(lower)alkyl carbamic acid.

2. A compound according to claim 1 in which $R^2CO$ is dimethylcarbamoyl.

3. Isopropyl - N - dimethylcarbamoyl - N - m - chlorophenyl carbamate.

4. Isopropyl - N - dimethylcarbamoyl - N - phenyl carbamate.

References Cited

Binaghi, C.A. 26 5926 (1962).
Nijk, C.A. 15 1509–10 (1921).

FLOYD D. HIGEL, *Primary Examiner.*